United States Patent Office 2,880,300
Patented Mar. 31, 1959

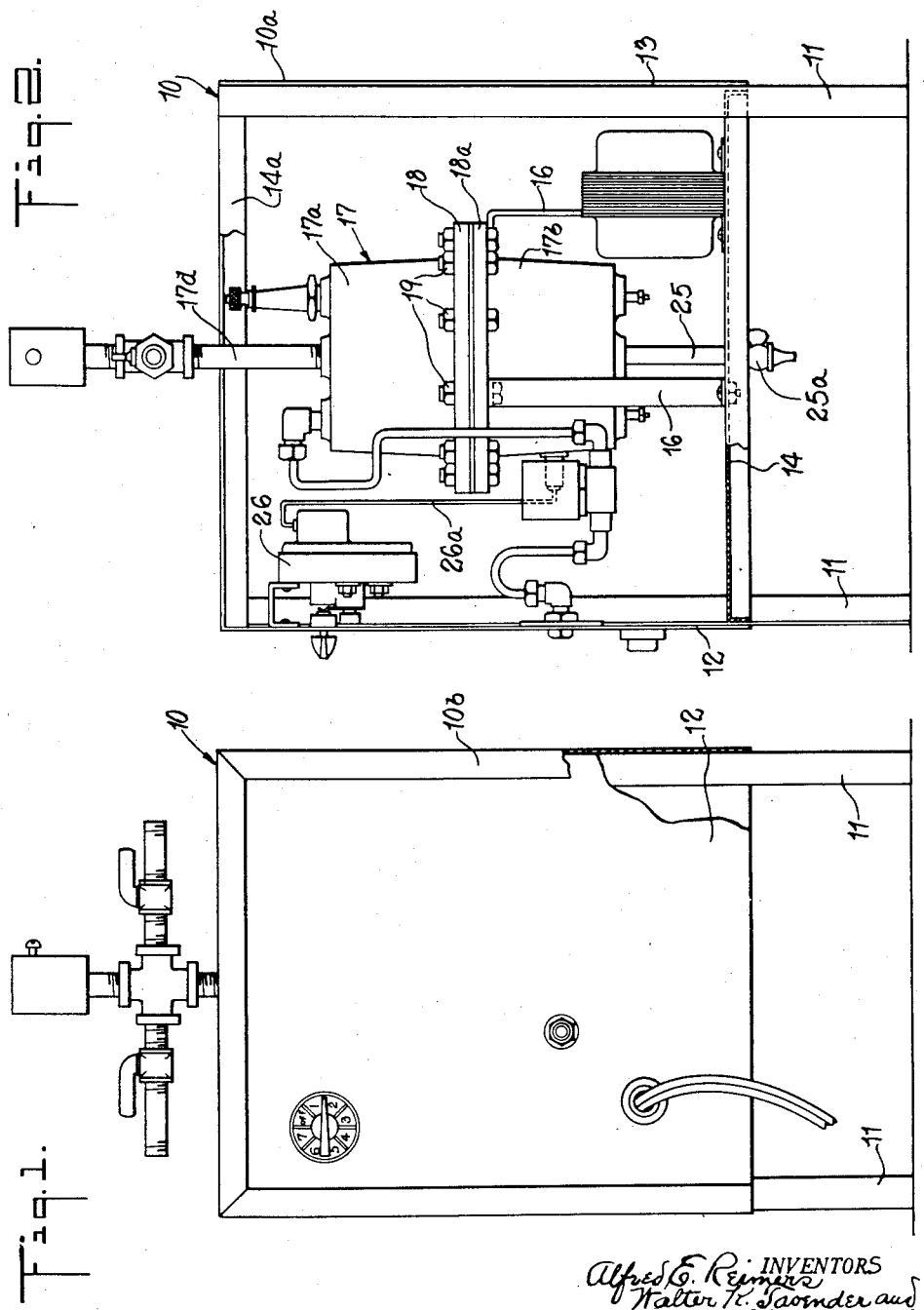

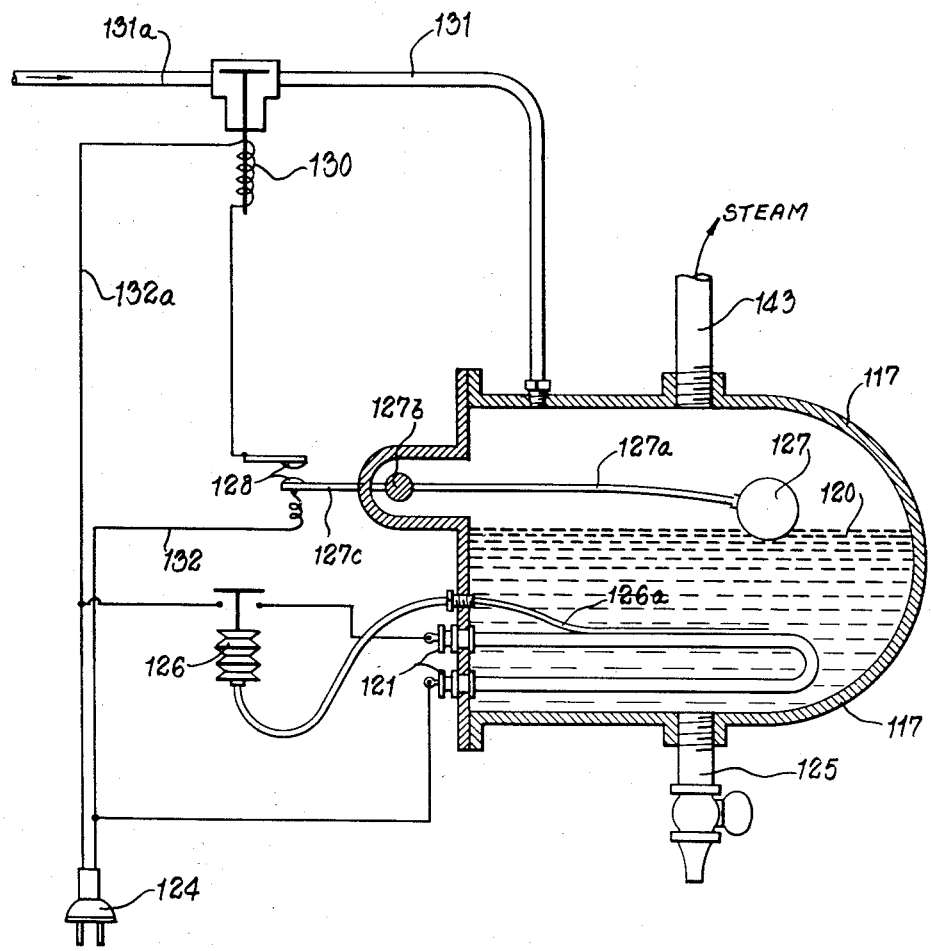

2,880,300

ELECTRICALLY-HEATED STEAM GENERATORS

Alfred E. Reimers, Walter K. Tavender, and Leonard J. McCormack, Jr., Frederick County, Va., assignors to Reimers Electric Appliance Co., Inc., Clearbrook, Va., a corporation of New York Application February 6, 1953, Serial No. 335,574

9 Claims. (Cl. 219—38)

This invention relates to electrically-heated steam generators.

One of the objects of this invention is to produce a relatively small and compact steam generator preferably comprising a boiler or generator casing and a mounting housing therefor, which are capable of fabrication in a suitable plant as a complete unit that may be shipped in commerce to the site of use and installed by a simple standard plug-in connection with a source of electricity and with a hose connection having standard fittings to a water supply, and that may be employed, for example, as a source of steam supply in industrial pressing machines and sadirons.

Another object of our invention is in a steam generator of the character specified to provide an electric heater adapted to be immersed in a small body of water and embodying an electric heating element, in combination with positive current-control means for cutting off electric current to the heating element in the event of failure of the water supply and a consequent rise in temperature of said element beyond the predetermined high point, thus preventing the burning out and ruining of the element and heater.

Another object of our invention is to utilize in a steam generator of the character specified having a generator casing provided with an electric heater, a thermostat as the current-control means and to mount the control member of said thermostat in reasonably close adjacency with said electrical heater, and with this end in view we provide our thermostat with a control member having a heat-collecting section contacting said electric heater, and mount said thermostat within an enclosing housing having walls closely adjacent to said generator casing and we mount said control member of the thermostat on one of said walls, whereby the temperature of the heating element may be properly controlled and the electric current will be cut off, in the event of excessive heating of the heater, by operation of the thermostat.

Another object of this invention is to provide a two part metallic carrier-housing for enclosing said generator casing and mounting the controlling elements thereof, one of said parts comprising a carrier-portion on which the generator casing and controlling elements are mounted and which is open at its top and two sides to permit ready access to the said generator casing and other parts, while the other part comprises a closure member slidable over said stationary carrier part to enable complete enclosing of the generator casing and control elements.

Another object of this invention is to provide an electrically-heated generator casing having a shape which is as nearly spherical as practical so as to procure the largest practical ratio of volume to radiating surface and which will be formed of two strong and durable cup-shaped parts, one of which is inverted in relation to the other to permit assembly therein of the heating element and our heat control member.

Another object of our invention is to connect the two parts of our steam generator so as to provide a strong and durable casing which will not easily get out of order, and within which steam may be generated, and the parts of which may be easily separable to permit ready cleansing.

Another object of this invention is to combine in a steam generator a strong and durable generator casing of the type specified adapted to contain a small body of water and to support in completely enclosed condition in said casing a completely-enclosed, simple and sturdy electrical heater combined with control means for the current and water supply that will permit direct immersing of said heater in said body of water, and when so immersed will be capable of heating the water to produce steam by a current derived from conventional electric supply sources, whereby a sufficient and reliable supply of steam for the industrial uses hereinabove specified and others may be obtained from such small body of water.

Another object of this invention is to utilize in a unit of the type specified an efficient electrical heater composed of a resistor element sealed in a strong and durable metallic heat-transmitting cover therefor that will not get out of order and will permit its body portion to be immersed in a suitable water supply.

Another object of this invention is to support in immersed condition within a generator casing of the type specified a heater provided with terminal ends extending through the casing and being electrically connected with a current supply through a suitable control circuit embodying a thermostat having a heat-collecting member mounted in close proximity to the immersed heater and cooperating with a pressure-transmitting contact-tube extending through the generator casing to produce accessible control of the immersed heating element within the casing.

Another object of our invention is in a steam generator unit of the character specified, to provide in combination with a thermostaticaly-controlled electric heater an electrically-controlled water-feeding means for maintaining in the steam generating chamber a predetermined water level.

Another object of our invention is to provide in a device of the character specified an electrically-controlled water-feeding means which will embody a solenoid-controlled valve for feeding water from a suitable water supply in proper and sufficient quantity to normally raise and maintain such water in the generator casing at a predetermined level, in combination with means controlled by said water level for actuating said water-feeding solenoid valve.

Such actuating means for the solenoid valve may comprise an electric switch in a suitable circuit which is moved to open and closed positions by a float movable by the level of water in the generator, and thus controlling the water-feeding operation of the solenoid valve. Such a float element will be desirable in cases where the water being fed to the generating casing has been subjected to a demineralizing operation, but in the preferred embodiment of our invention said water-level controlling means comprises an electrode suitably mounted in the generator casing and having a suitable electrically-connected water-contacting disc which is adapted to maintain contact with the water in the unit at a predetermined level, and which when contact between the electrode and such water is broken causes actuation of the electrically-controlled solenoid valve to feed water into the boiler unit and thus at all times to control and maintain a proper and efficient water level for the production of steam within the unit.

Another object of our invention is in a device of the character specified to also connect the thermostat with a solenoid water valve and thus to utilize operation of the thermostat to control the water supply, it being understood that when current is cut off from the solenoid water valve, it will be closed to water flow by a conventional spring in the valve and by the unbalanced water pressure which will act to force the valve against its seat.

Another object of our invention is to provide in a steam generator device of the character specified a steam equalizing device embodying a container having a supply of water and a steam chamber above and contacting with said contained water to which steam generated in our steam generator casing is fed.

With these and other objects in view, the invention comprises the combination of members and arrangement of parts so combined as to co-act and cooperate with each other in the performance of the functions and the accomplishment of the results herein contemplated, and comprises in one of its adaptations the species or preferred form illustrated in the accompanying drawings, in which:

Fig. 1 is a front elevation of an electrically-heated steam generator unit of our invention, with a part of the two part carrier-housing broken away;

Fig. 2 is a side elevation of the generator shown in Fig. 1 with the cover portion of my two part carrier-housing removed and showing in elevation the generator casing and control elements therefor but omitting the circuit wiring;

Fig. 4 is a view partly diagrammatic and partly in section showing a modified form of steam generator and electrical controlling elements therefor.

Figure 3:
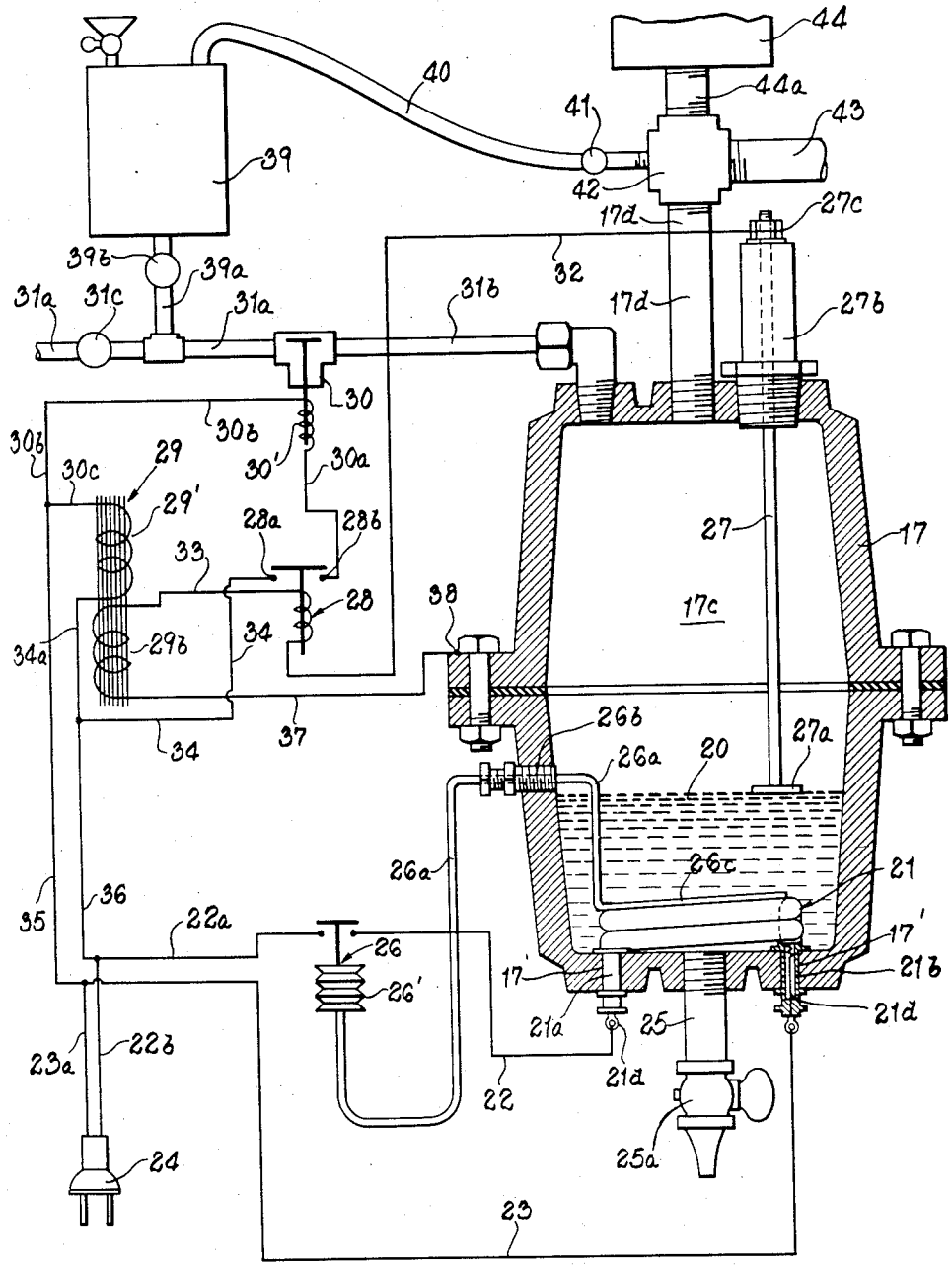
Fig. 3 is an enlarged longitudinal sectional view through our generator casing removed from the housing and showing the electrical control elements symbolically.

Referring now to these drawings, and particularly to Figs. 1 to 3 thereof, which illustrate the preferred embodiment of our invention, 10 indicates a two-part carrier-housing comprising a carrier or mounting part 10$^a$ for our steam generator casing and controlling elements therefor and a slidably removable cover part adapted to be slidingly fitted over the carrier or mounting part to completely enclose the said steam generator casing and its controlling elements. As shown the carrier or mounting part comprises a skeleton embodying four corner uprights 11, having adjacent to their lower ends a transverse floor plate 14 adapted to support said generator casing and controlling elements, and suitable top strips 14$^a$. The said cover portion preferably comprises a U-shaped member 10$^b$ embodying top and opposite side plates adapted to be slidingly mounted upon and removable from the skeleton housing or carrier which preferably is composed of the skeleton hereinabove specified and having front and rear plates 12 and 13 permanently connected thereto while the opposite sides are initially open and finally closed by the vertically-slidable and removable U-shaped part composed of top and side plates. Thus the interior of the housing 10 and the contents thereof may be exposed to view by the removal of said U-shaped part.

In said preferred embodiment of our invention we mount upon the floor plate 14 by means of triangularly positioned legs 16 a steam generator casing 17 which is preferably as nearly spherical as practical so as to procure the largest possible ratio of volume to radiating surface and, as shown, is composed of top and bottom cup-shaped metallic parts 17$^a$—17$^b$, one of which is inverted in relation to the other, and such metallic parts have meeting rim flanges 18, 18$^a$ fastened together. The casing, as shown, is formed of suitable cast metal. As illustrated, the rim flanges 18, 18$^a$ are releasably secured together by a series of nut and bolt elements 19 to provide a hollow steam generator, the parts of which may be readily disassembled for cleansing and which will be adapted to receive a given amount of water for conversion into steam. We also preferably provide at the bottom of said casing 17 a drain conduit 25 having an outlet valve therefor 25$^a$ and at the upper end of the casing provide a suitable steam outlet pipe 17$^d$ having a screw-threaded connection with the casing.

In the said preferred embodiment of our invention shown more particularly in Fig. 3 we provide within the steam generator casing 17 a suitable body of water 20 and we immerse in said body of water an electrical heater unit 21 composed of a suitable number of coils in direct contact with the water. The heater unit 21 preferably has its terminal ends 21$^a$—21$^b$ extending through apertures 17' in the bottom of the casing 17. The heating unit 21 may be of any suitable construction and preferably includes a heat-conductive outer cover member or heater coil 21 and a suitable resistor member 21$^d$ which may be of any suitable heat-resisting alloy such as nickel, iron and chromium with or without an admixture of manganese and may be made from "Nichrome" wire which consists of such an alloy. These terminal ends of the heater unit are connected in an electrical circuit by wires 22—23 which connect with an electric plug 24 adapted to be inserted in any suitable electrical socket for the purpose of supplying current to the resistor 21$^d$ for the purpose of heating the coil 21, and thus heating and evaporating the body of water 20 to produce steam within the steam chamber 17$^c$ of the casing 17. The resistor is normally heated, for example, to a bright redness or incandescence and the heat therefrom is imparted to the highly heat conductive outer tube or cover-shell and thence to the water 20 within the casing 17 for the purpose, as aforesaid, of evaporating the same and producing steam within a chamber 17$^c$. The terminal ends of the conductive cover-tube 21 preferably pass through steam-tight fittings in the bores 17' in the casing and the terminals of the resistor of the heater pass through the terminal ends of the tube 21 and preferably are provided with suitable electrical connecting devices. Such a heating element is simple, small, compact and practically indestructible and may be produced at a very low cost.

There is furthermore an economic consumption of current.

In the preferred embodiment of our invention we preferably provide means for preventing the burning out of the heating element, as for example if and when the water in which the element is immersed is completely evaporated. In such event, the temperature of the heating element would rise beyond the predetermined point of safe operation and unless controlled might be burned out. To prevent burning out through excess temperatures, we provide in the electric circuit to the heater suitable means for cutting off the current upon a rise in temperature beyond such safe operating conditions which may be due, as aforesaid, to an absence of water in the generator casing. With this end in view, we connect up within the circuit 22, 22$^a$, 23, 23$^a$ from the plug 24 to the heater 21 a bellows-operated thermostat 26 adapted to cut off the current in such event. Such a thermostat may be set to operate adjustably to a temperature of 275° F. which is well below he melting point of the materials in the heating element 21.

In the preferred embodiment of our invention, the thermostat 26 is positioned in relatively close relationship to the electrical heating element 21 and, as shown, the operating member 26' thereof is mounted on a pressure-transmitting liquid filled tube 26$^a$ of suitable material, such as copper, which tube extends through a steam-tight element 26$^b$ mounted in the casing 17 and has a heat-collecting terminal section 26$^c$ in direct and close heat-transmitting contact with and preferably fastened to the heating element 21. Pressure will thus be continuously transmitted to the operating member 26' and thermostat 26, and in view of the positioning of the operating or controlling member of said thermostat 26 in close relationship to the heating element, and the close positioning and preferably contact or fastening of the heat-collecting terminal section to the said heating element, said device may be accurately set to automatically cut off the current to said element 21 in the event that the heat to said thermostat controlling member 26ᶜ reaches a predetermined degree of heat.

In the preferred embodiment of our invention, we also provide electrical water-level control means for maintaining the water within the generator casing 17 at a predetermined level. Such control means is arranged, in the event of the lowering of such water beyond a predetermined level, to immediately cause additional water to be supplied to the chamber 17ᶜ of the casing 17 in order to bring such water up to said predetermined level.

In the preferred embodiment of our invention such water-level control means comprises the provision within the chamber 17ᶜ of an electrode 27 suitably mounted in the casing 17 and having a water-contacting disc 27ᵃ. Said electrode is connected in a suitable electric circuit with a relay 28 and transformer 29 for the purpose of operating a solenoid valve 30 which is thus adapted automatically, upon a breaking of the contact between the disc 27ᵃ and the water-supply 20, to feed additional water through the conduit 31ᵃ and supply pipe 31ᶜ to the chamber 17ᶜ and to the water 20 therein so as to raise the level thereof, it being understood that when such level contacts with the disc 27ᵃ the relay 28 will be operated to cause the solenoid valve 30 to be closed and prevent any further supply of water to the chamber 17ᶜ.

In the embodiment shown, the electrode 27 is mounted in a suitably insulated holder 27ᵇ and is connected at 27ᶜ with water-controlling circuits including wire 32, relay coil 28, wire 33 through a coil of section 29ᵇ of transformer 29, and ground 38 on casing 17. The transformer 29 has a coil 29' and is connected to one terminal of the plug 24 by wires 23ᵃ, 35, 30ᶜ and to the other terminal by 34ᵃ, 36 and 22ᵇ. One terminal 28ᵃ of said relay 28 is connected by wires 34 to a circuit of the transformer coil 29' and also is connected by wires 36 and 22ᵇ to one terminal of the plug 24, while the other terminal 28ᵇ of the relay 28 is connected by wire 30ᵃ to the coil 30' of the solenoid valve 30 and thence by wire 30ᵇ to the wire 30ᶜ of the circuit of transformer coil 29', which as aforesaid is connected with the plug 24. The solenoid water valve 30 is connected in a supply conduit 31ᵃ, 31ᵇ which may lead to any suitable source of water supply not shown and is also provided with a suitable hand-actuated supply valve 31ᶜ.

In said preferred embodiment of our invention, we provide between the supply-valve 31ᶜ and the solenoid operated valve 30 a suitable emergency water-supply tank 39 which, as shown, is connected to the water-supply pipe 31ᵃ by connecting pipe 39ᵃ controlled by a hand-valve 39ᵇ. The tank 39 is kept nearly full of water, and steam from the generator is fed into the top thereof to equalize the pressure in said tank with the pressure in the generator. Said emergency water supply tank 39 is preferably connected to the steam chamber 17ᶜ of the generator casing 17 by a steam conduit 40 which is provided with a controlling valve 41 and is connected through a suitable connection 42 with the main outlet steam pipe 17ᵈ leading to said chamber 17ᶜ.

The main steam outlet pipe 17ᵈ of the generator is connected with a steam outlet pipe 43 and it will be obvious that the steam supply passing through this pipe 43 may be used for any suitable purpose such as a steam supply for industrial pressing machines and sadirons.

The generator is also preferably provided with a suitable safety valve 44 which as shown is connected with the steam supply connection 42 by conduit 44ᵃ.

Under certain conditions it is desirable instead of utilizing an electrode and its relay circuit 27 for providing a supply of water when the water in the casing is reduced beyond a predetermined level, we preferably provide a modified construction of steam generator which preferably comprises a suitable casing 117 provided with a water supply 120 and having a thermostatically-controlled electrical heating element 121 which, as illustrated, is controlled by thermostat 126 having heat-transmitting member 126ᵃ. Said heating element and thermostatic controlling means are in all respects similar to the devices hereinabove described in relation to Figs. 1 to 3, but in this modification instead of the electrode 27 we provide in the water in the casing 117 a float 127 which is mounted upon a lever arm 127ᵃ pivoted on pivot 127ᵇ and having an operating portion 127ᶜ connected with an electrical switch 128 operated by the movement of the float and its lever 127—127ᵃ. This switch, as illustrated, is embodied in a circuit including wires 132, 132ᵃ with the plug 124 and a solenoid 130 is embodied in said circuit for controlling the supply of water through conduits 131 which is supplied through conduit 131ᵃ and has a connection with the casing 117.

This construction may, if desired, be provided with the steam equalizing and emergency tank and also with the safety valve if desired.

In this construction an outlet pipe 143 for steam is provided and is, as above indicated, preferably used for the purposes hereinabove specified.

Having described our invention, we claim:

1. An electrically-heated steam generator comprising in combination, a boiler casing composed of a plurality of separate parts and adapted to contain a suitable small charge of water, an electrical heating element having a body portion suitably supported within said boiler casing and adapted to be immersed in said charge of water and provided with terminals extending through water-tight apertures in a water-containing part of said casing, an electrical circuit connecting said terminals with a suitable source of current supply, a carrier housing within which said boiler casing is mounted, a thermostat electrically connected in said current-supply circuit and having its heat-controlling member physically mounted within said housing in relatively close position to the immersed body-portion of said heating element, said heat-controlling member embodying a pressure transmitting member extending from said thermostat through said boiler-casing and into contact within said boiler casing with said immersed body portion of said electrical heating element.

2. An electrically-heated steam generator as claimed in claim 1 in which the heat-controlling member is provided with a heat-collecting element disposed in contact with and immersed in conjunction with said electrical heating element.

3. An electrically-heated steam generator as claimed in claim 1 in which the carrier housing is composed of a relatively fixed boiler-mounting part comprising a supporting floor member having a plurality of suitably spaced and fixed upright members mounted thereon and a removable cover part fitted to and slidable vertically over said fixed upright members to closely enclose said boiler-casing and its controlling elements.

4. An electrically-heated steam generator comprising, in combination, a boiler-casing adapted to contain a suitable supply of water, an electrical heating element having a body portion suitably supported within said boiler casing and adapted to be immersed in said supply of water and provided with terminals extending through apertures in said boiler-casing, an electrical circuit connecting said terminals with a suitable source of current supply, a carrier housing within which said boiler-casing is mounted, a thermostat connected with and controlling said circuit and mounted within said carrier-housing in relatively close position to said heating element, said thermostat being provided with a pressure-transmitting member extending through the generator casing and into contact with said electrical heating element, and means also controlled by said thermostat for maintaining a predetermined level of water in said boiler-casing.

5. An electrically-heated steam generator comprising, in combination, a boiler-casing adapted to contain a suitable charge of water, an electrical heating element having a body portion supported within said boiler-casing and adapted to be immersed in said charge of water and provided with terminal ends extending through apertures in said casing, an electrical circuit connecting said terminals to a suitable source of current supply, a carrier housing within which said boiler casing is mounted, a thermostat in said circuit mounted within said housing in relatively close position to said heating element and provided with a pressure-transmitting member extending through the casing and into contact with said electrical heating element, a solenoid valve and actuating means for said solenoid valve operable by a lowering of the level of water in said boiler-casing to open said valve and deliver additional water to said boiler-casing until the level thereof is restored to such predetermined level.

6. An electrically-heated steam generator as claimed in claim 5 in which said charge valve-actuating means comprises a circuit including an electrode normally contacting with the charge of water and operable upon the lowering of the level of said water out of contact with the electrode to actuate said solenoid valve to cause an additional supply of water to be added to the water charge in said generator boiler.

7. An electrically-heated steam generator comprising, in combination, a boiler-casing adapted to contain a suitable charge of water, an electrical heating element having a body portion suitably supported within said boiler-casing and adapted to be immersed in said charge of water and provided with terminals extending through apertures in said casing, an electrical circuit connecting said terminals with a suitable source of current supply, a carrier-housing within which said boiler-casing is mounted, a thermostatic means in said current supply circuit for controlling the passage of current therethrough to the electrical heating element, and means including an electrical circuit for maintaining a predetermined level of water in said boiler-casing and a solenoid valve in said circuit, and means operable by a lowering of the level of water charge in said boiler-casing adapted to operate said solenoid valve to deliver additional water to said boiler-casing until the level of the charge therein is restored to such predetermined level.

8. An electrically-heated steam generator as claimed in claim 7 in which said water-level controlling means comprises an electrode extending within the boiler-casing and having a water contact plate adapted to contact with the water charge therein, said electrode having an electrical connection through said water charge with said solenoid valve and being adapted upon the lowering of the water charge in said casing to break contact with said contact plate and to operate said solenoid valve to deliver additional water to said casing.

9. An electrically-heated steam generator as claimed in claim 7 in which the thermostat is also arranged in circuit with the operating means for said solenoid valve to control the discharge therethrough of water.

References Cited in the file of this patent
UNITED STATES PATENTS

| | | |
|---|---|---|
| 1,561,243 | Keene | Nov. 10, 1925 |
| 1,715,687 | Vaughan | June 4, 1929 |
| 1,754,580 | Staley | Apr. 15, 1930 |
| 1,930,551 | Blashfield | Oct. 17, 1933 |
| 1,999,962 | Des Rosiers | Apr. 30, 1935 |
| 2,500,219 | Troupe | Mar. 14, 1950 |